UNITED STATES PATENT OFFICE.

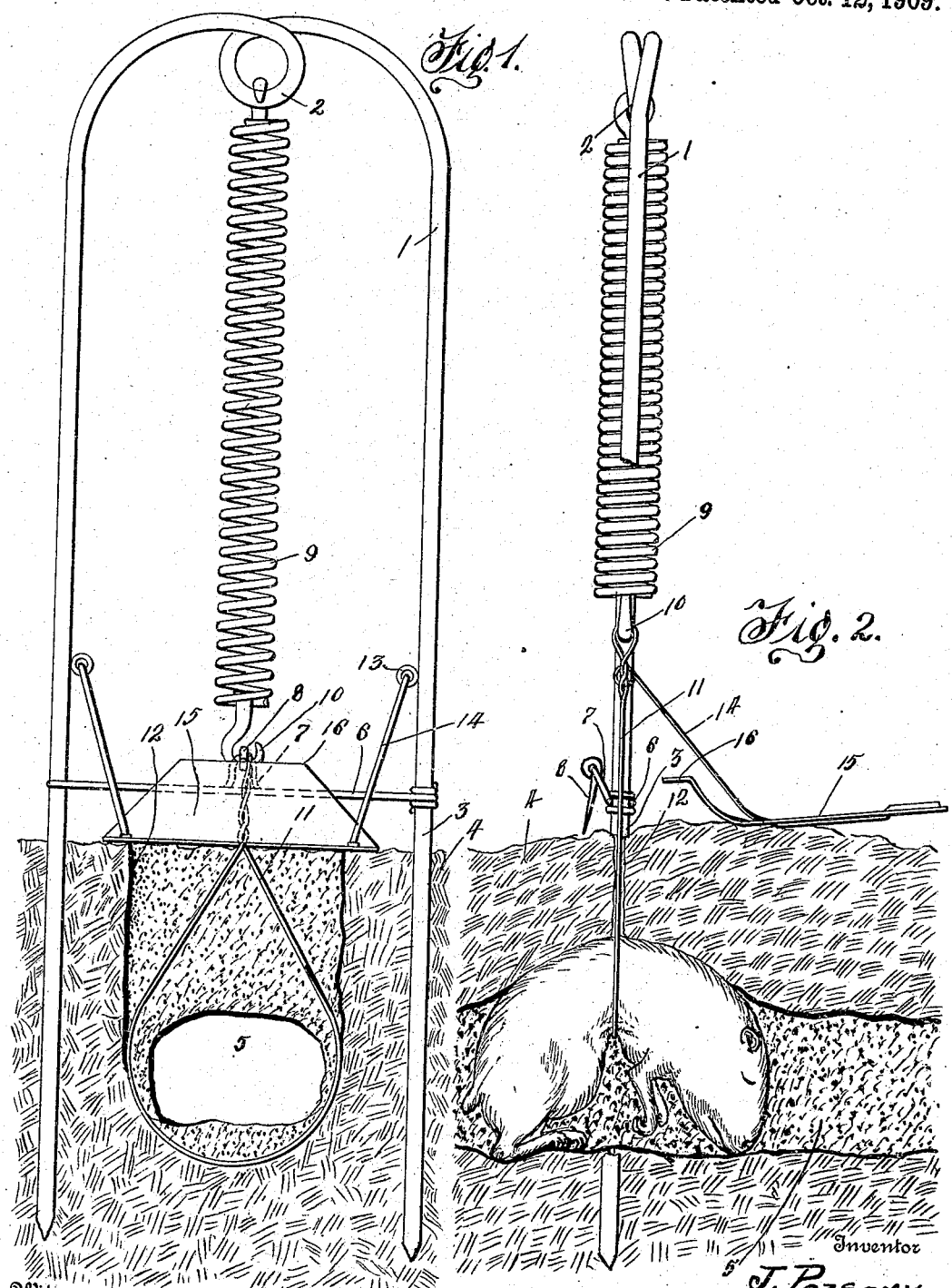

JOSEF POZSONYI, OF SEWICKLEY, PENNSYLVANIA.

TRAP.

936,808.

Specification of Letters Patent.

Patented Oct. 12, 1909.

Application filed May 14, 1909. Serial No. 495,975.

*To all whom it may concern:*

Be it known that I, JOSEF POZSONYI, a subject of the King of Hungary, residing at Sewickley, in the county of Allegheny and State of Pennsylvania, have invented certain new and useful Improvements in Traps, of which the following is a specification, reference being had therein to the accompanying drawing.

This invention relates to traps, and more particularly to a trap for catching moles or similar underground animals.

The object of this invention is to provide a trap that can be easily and quickly placed in position in the crevice of a mole hole, or in an opening provided therefor that will intersect the mole hole, whereby when the mole forces its way through an opening, the trap will be immediately released to hold the mole until it is removed.

The above object is attained by providing a spring actuated trap adapted to be released by a mole forcing its way through an opening and causing an upheaval of the ground adjacent to the trap, the movement of the ground being sufficient to release the trap and cause the mole to be firmly held within the hole until such time as it can be dug out.

The detail construction of the trap will be hereinafter fully described, and reference will now be had to the drawing forming a part of this application, wherein there is illustrated the preferred embodiments of my invention, but I would have it understood that the detail construction thereof can be varied or changed without departing from the spirit of the invention.

In the drawings:—Figure 1 is a front elevation of the trap constructed in accordance with my invention; Fig. 2 is a side elevation of the same partly broken away and partly in section.

In the drawings, 1 designates an inverted U-shaped frame preferably made of a strong and durable rod or piece of wire bent to provide a central eyelet or loop 2, and rounded ends 3 adapted to enter the ground 4 at the sides of a mole opening 5. The sides of the frame 1 directly above the ground 4 are connected together by transverse braces 6 providing an eyelet 7, to which is pivotally connected a pin 8.

Detachably connected to the loop or eyelet 2 is a coil spring 9 having the lower end thereof provided with a hook 10, and detachably connected to the hook 10 is a wire loop 11 adapted to extend downwardly through a crevice or crack 12 intersecting the mole opening 5.

The confronting sides of the frame 1 directly above the transverse braces 6 are provided with eyelets 13 and pivotally connected to said eyelets are curved arms 14, said arms supporting a flat plate 15 having a ledge 16 for engaging the pin 8.

To set the trap, the loop is pulled downwardly into the crevice or crack 12, the pin 8 thrown across the hook 10, and the ledge 16 of the flat plate 15 placed in engagement with the pin 8, the position of the ledge in engagement with said pin being approximately in a vertical plane with the eyelets 13, and sufficiently out of said plane to permit of the plate being moved to release the pin 8.

A mole forcing itself into the opening 5 raises the ground, as shown in Fig. 2, and elevates the plate 15 sufficiently to release the pin 8. The tension of the spring 9 then pulls upwardly upon the loop 11 and holds the mole within the opening 5 until it can be dug out.

Having now described my invention what I claim as new, is:—

1. A trap of the type described, comprising an inverted U-shaped frame, a coil spring attached to the upper end of said frame, a hook carried by the lower end of said spring, a transverse brace carried by said frame, a pin arranged intermediate the ends of said brace and adapted to engage the hook of said spring and retain said spring under tension, a loop detachably mounted upon the hook of said spring, and a plate pivotally connected to said frame for engaging said pin and temporarily holding said pin in a locked position.

2. A trap of the type described, comprising a frame, a spring connecting with the upper end of said frame, a transverse brace carried by said frame, a pin carried by said brace and adapted to engage the lower end of said spring for retaining the same under tension, a loop detachably connected to the end of said spring, and a plate for locking said pin in engagement with the hook of said spring.

In testimony whereof I affix my signature in the presence of two witnesses.

JOSEF POZSONYI.

Witnesses:
  A. H. RABSING,
  NICHOLAS TEOKE.